Patented Mar. 19, 1929.

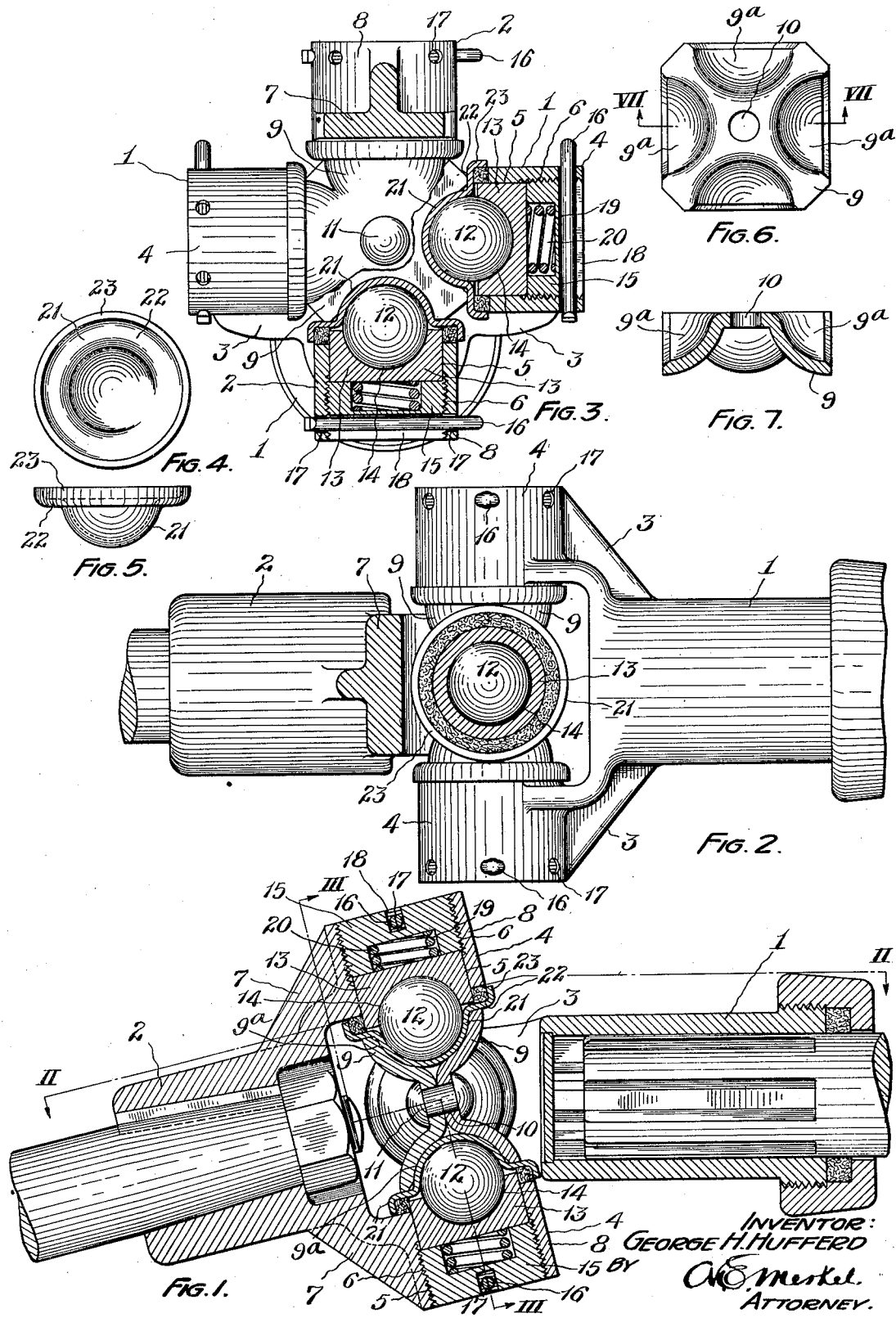

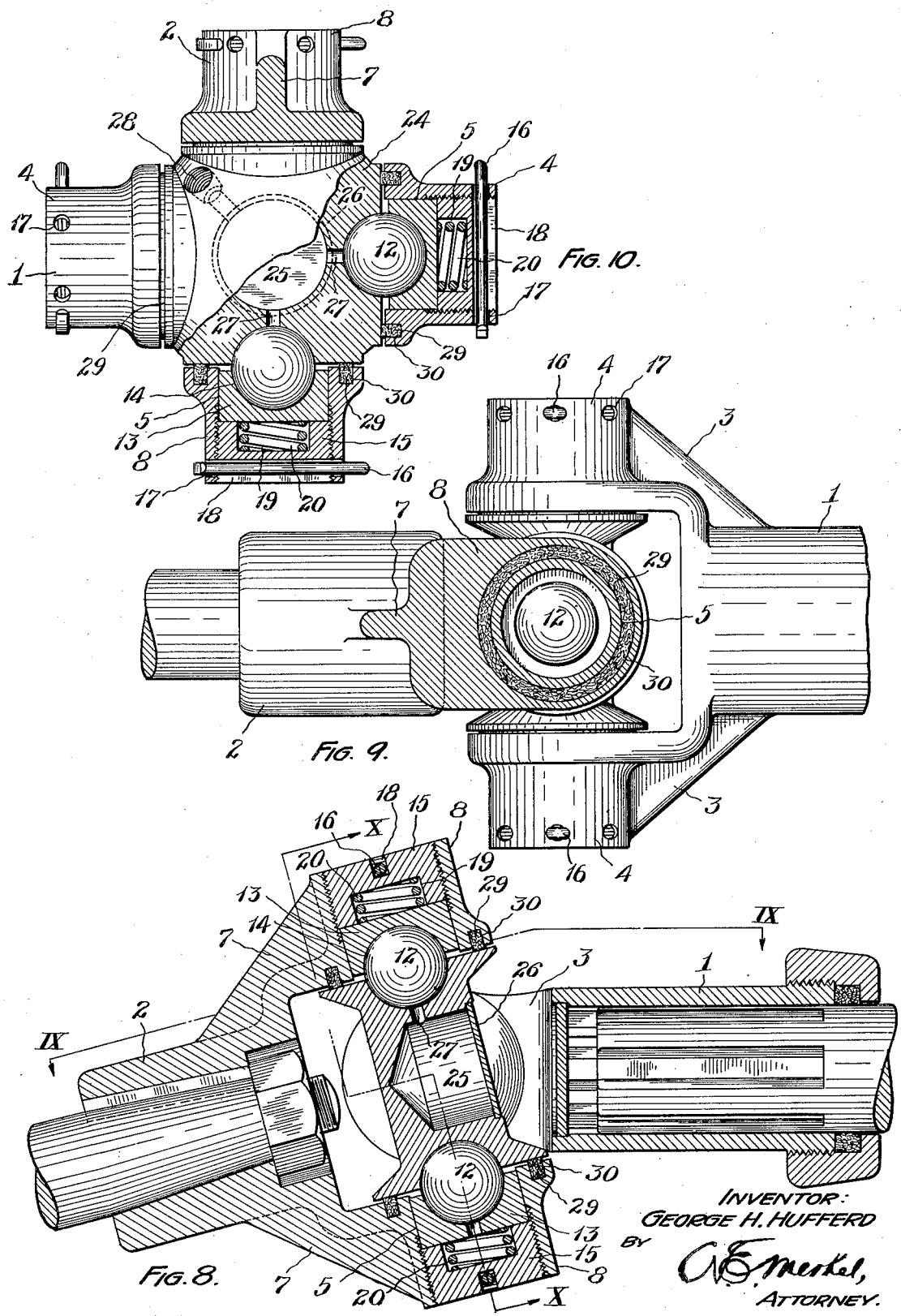

1,705,731

UNITED STATES PATENT OFFICE.

GEORGE H. HUFFERD, OF DETROIT, MICHIGAN, ASSIGNOR TO THOMPSON PRODUCTS INC., OF CLEVELAND, OHIO, A CORPORATION OF OHIO.

UNIVERSAL COUPLING.

Application filed October 1, 1926. Serial No. 138,999.

The invention relates to universal couplings adapted to transmit rotary motion from a driving member, such as an engine shaft, to a driven member, such as the transmission shaft of an automobile which gives a rotary motion to the rear axles.

Universal couplings have been constructed in many different forms, many of which are complicated and expensive to manufacture. It is the object of this invention to provide a construction which will effectively perform the functions desired in a universal coupling but which will be comparatively simple in its parts, cheap in manufacturing cost, and safe and durable in use.

One of the principal ideas of this invention consists in the employment of balls which furnish the pivotal connections of the universal joint and at the same time a connecting means between the driving and driven members which precludes their separation by relative longitudinal motion.

The invention consists in the construction and arrangement of parts hereinafter described and claimed.

In the annexed drawings:

Figure 1 is a longitudinal section through the improved coupling;

Fig. 2 is a plan section on line II—II of Fig. 1;

Fig. 3 is a cross section on line III—III of Fig. 1;

Fig. 4 is a plan view of a ball seat employed in my invention;

Fig. 5 is a side elevation of the ball seat shown in Fig. 4;

Fig. 6 is an inside elevation of one of the mating plates forming the intermediate member of my improved universal joint;

Fig. 7 is a section through line VII—VII of Fig. 6;

Fig. 8 is a longitudinal section through a modified form of coupling constructed in accordance with my invention;

Fig. 9 is a plan section on line IX—IX of Fig. 8;

Fig. 10 is a cross section on line X—X of Fig. 8.

Referring to the drawings in detail in which the same reference number is used throughout to designate the same part, and particularly to Figures 1 to 7 inclusive which show the form now preferred by me, the driving and driven members are designated by the numbers 1 and 2 respectively, although it is to be understood that either part may be the driving member or the driven member. The driving member is provided with projecting arms 3 which end in enlargements or heads 4 which are preferably cylindrical in form. Each head 4 is provided with a radial bore 5, interiorly threaded at the outer end as indicated at 6. The driven member 2 is provided with like arms 7 having similar heads 8 and constructed in the same way as heads 4 of the driving member.

The driving and driven members may be connected in various ways, but in the preferred form, they are connected by an intermediate member formed of two metal plates 9 which are pressed or stamped to form a plurality of spherically curved recesses 9$^a$, clearly shown in Figs. 6 and 7. These mating plates each have a central aperture 10 through which passes a rivet 11 securing these plates in rigid relation to each other with the recesses 9$^a$ in registration, whereby such recesses form a plurality of hemispherical ball seats, for a plurality of balls 12 which serve as connecting means between the driving and driven members, and the intermediate member.

As above stated, the heads are provided with radial bores in each of which is engaged a ball seat or plunger 13 provided with a hemispherical bearing surface 14. The outer end of the bore is closed by an externally threaded plug 15 which may be secured in any adjusted relation by cotter pin 16, passed through a diametrically arranged pair of a plurality of apertures 17 in the outer end of the head and through a slot 18 in the outer end of the plug. The inner end of the plug is seated against the outer end of the ball seat 13 and is provided with a central recess 19 in which is mounted a spring 20 bearing at one end against the bottom of the recess and at the other end against the outer end of the ball seat 13. This spring serves to constantly bias the ball seat 13 toward the ball 14 so as to automatically take up wear and prevent rattling.

As the plates 9 would ordinarily be formed of non-wear-resisting material, it is preferable to employ therewith a hardened wear-resisting ball seat 21 consisting of a plate of wear-resisting material having a hemispherical recess therein and provided with an annular flange 22 adapted to rest on the outer margins of the plates 9 and ending in an upturned edge 23. It is found desirable to use a resilient washer between the flange 22 and the inner edge of the head 4 to prevent the entrance of dust and dirt to the ball joint.

The modified form of the device illustrated in Figs. 8 to 10 inclusive differs from the form shown in Figs. 1 to 7 inclusive in the construction of the intermediate member. In this form the intermediate member is composed of an integral member or block 24 having a plurality of hemispherical ball seats in the outer surface corresponding in number to the number of heads in the driving and driven members (ordinarily four). The bearing surfaces in this block are ordinarily hardened, or the block is made of wear-resisting material, so that it is unnecessary to employ a bearing plate, such as the plate 21 of the preferred form. This block is preferably provided with an axial recess 25 closed by a plate 26 in which to store lubricating material which has access to the ball joint through a plurality of apertures 27 leading from the central recess 25 to the ball joint. The lubricant may be inserted through an opening 28.

In this form an annular washer 29 may be inserted in a recess 30 arranged to engage the outer surface of the block 24, acting as a closure to prevent the entrance of dust and dirt to the ball joint.

While in both of the forms above described the intermediate member is located within the heads, it might be placed outside thereof, and hence my invention, in its broadest aspects, includes such an arrangement although not specifically described herein, this specific embodiment forming the subject matter of another application of even filing date herewith, Oct. 1, 1926, Serial No. 138.998.

While I have set forth specific embodiments of my invention, it is to be understood that such embodiments are merely exemplary of the principles involved in my invention, and that my invention is not to be confined to the details shown but includes all changes and modifications falling within the terms of the appended claims.

What I claim is:

1. As an article of manufacture, a member to act as a seat for ball bearing members, said member comprising a pair of plates secured together, each of said plates having peripheral sockets substantially quarter-spherical in form and extending on one side thereof, whereby when said plates are joined said sockets will unite to form seats for said ball bearing members.

2. In a device of the class described, an intermediate member comprising a pair of stamped complementary plates joined to provide peripheral semi-spherical sockets to receive balls, and resilient means for maintaining balls in said sockets.

3. In combination, a member having sockets to receive balls therein, said member comprising a pair of complementary stampings joined to define said sockets, and wear-resisting members engageable in said sockets to seat said balls.

4. In a universal coupling, an intermediate member comprising a pair of complementary stampings joined together and having peripheral semi-spherical sockets therein, wear-resisting cups in said sockets to receive bearing members therein, and flanges on said cups to embrace the edges of said sockets.

5. In a device of the class described, an intermediate member having peripheral semi-spherical sockets therein, wear-resisting means in said sockets, balls in said means, a driving member, a driven member, plungers cooperating with said driving and driven members and embracing the outer portions of said balls, and resilient means urging said plungers into intimate contact with said balls.

6. In a universal coupling, a bifurcated driving member, a bifurcated driven member, an intermediate member having peripheral sockets to receive balls therein, plunger seats to engage said balls in the furcations of said driving and driven members, plugs in said furcations, and resilient means seated in said plugs for urging said plunger seats against said balls.

7. In a universal coupling, a bifurcated driving member, a bifurcated driven member, the furcations of said members having passages therethrough, an intermediate member having peripheral semi-spherical sockets, balls in said sockets, a plunger recessed to receive one of said balls in each of said passages, a plug in each of said passages, and resilient means seated in one of said last mentioned elements to urge said plungers against said balls.

Signed by me this 7th day of September, 1926.

GEORGE H. HUFFERD.